April 27, 1926.

S. RINGER 1,582,541

METAL RECEPTACLE AND METHOD OF MAKING SAME

Filed Feb. 21, 1924      3 Sheets-Sheet 1

Inventor
Soren Ringer
By

April 27, 1926.
S. RINGER
1,582,541
METAL RECEPTACLE AND METHOD OF MAKING SAME
Filed Feb. 21, 1924      3 Sheets-Sheet 2
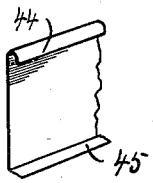
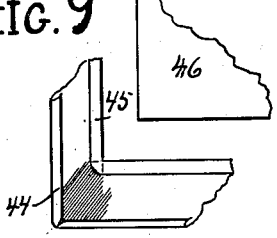
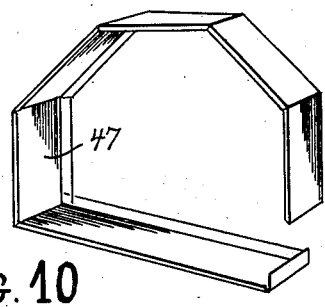
Fig. 8   Fig. 9   Fig. 10
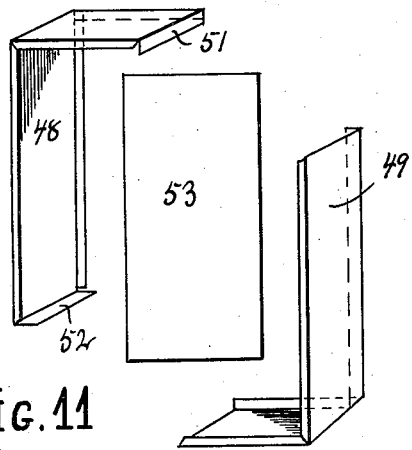
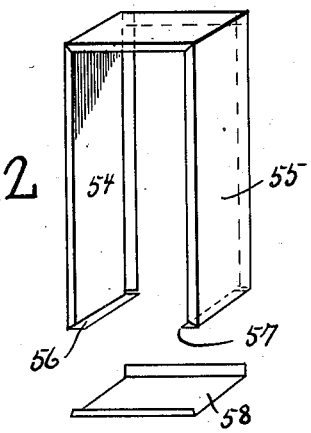
Fig. 11   Fig. 12
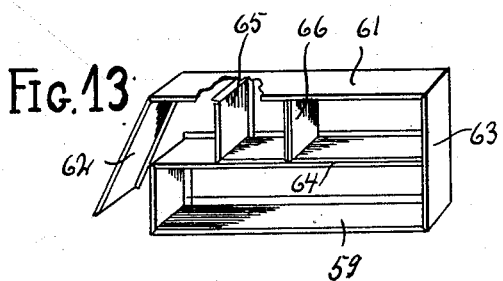
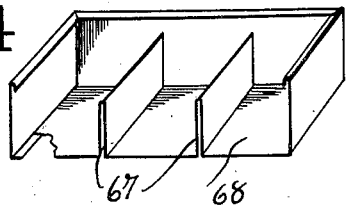
Fig. 13   Fig. 14
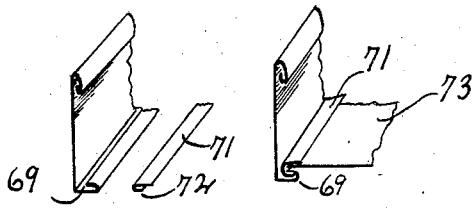
Fig. 15

April 27, 1926.

S. RINGER 1,582,541

METAL RECEPTACLE AND METHOD OF MAKING SAME

Filed Feb. 21, 1924   3 Sheets-Sheet 3

Inventor
Soren Ringer
By Chas J Wilson
Atty.

Patented Apr. 27, 1926.

1,582,541

UNITED STATES PATENT OFFICE.

SOREN RINGER, OF CICERO, ILLINOIS.

METAL RECEPTACLE AND METHOD OF MAKING SAME.

Application filed February 21, 1924. Serial No. 694,225.

*To all whom it may concern:*

Be it known that I, SOREN RINGER, a subject of the King of Denmark, residing at Cicero, in the county of Cook and State of Illinois, have invented certain new and useful Improvements in Metal Receptacles and Methods of Making Same, of which the following is a specification.

This invention pertains to receptacles such as boxes, drawers, cabinets and containers adapted for a wide variety of purposes, and while several practical embodiments of the invention which at present seem preferable are illustrated herein, it should be understood that the invention is in no wise limited by the specific embodiments shown for illustrative purposes merely.

Metal constructions adapted for the purpose for which my invention is particularly designed have heretofore been manufactured by stamping and drawing the metal to shape. This mode of manufacture was limited in its use by the limited degree to which metal can be successfully drawn and furthermore the manufacture was very expensive for the reason that the dies and tools required to form the desired product cost a great deal of money.

One of the primary purposes of my present invention is to produce a receptacle at extremely low cost by obviating the necessity of the employment of expensive dies and tools and by eliminating the limitations upon manufacture heretofore imposed by the use of such tools.

A further object is the production of a strong, substantial and durable receptacle from a single piece of sheet metal by a novel method which can be performed speedily and economically largely by hand.

A further object is to provide a receptacle which will present smooth rounded exterior corners having no projections or roughness of any kind such as is present in drawn metal receptacles, the corners in a receptacle made in accordance with my present invention being simply angular bends in the metal which is smooth and presents an attractive appearance.

For the purpose of facilitating an understanding of my invention I have illustrated on the accompanying drawings preferred embodiments thereof from an inspection of which in connection with the following description my invention and many of its inherent advantages should be readily appreciated.

Referring to the drawings:

Fig. 8 is a fragmentary view of a side wall of a receptacle adapted for a structurally independent bottom;

Fig. 9 is a fragmentary view of one corner of such recepetacle and bottom;

Fig. 10 shows a receptacle of different form partially completed;

Fig. 11 shows a three-piece receptacle embodying the principles of my invention;

Fig. 12 illustrates a modification thereof;

Fig. 13 illustrates a method of forming a receptacle with integral partitions;

Fig. 14 illustrates a modification thereof;

Fig. 15 illustrates fragments of a side wall and bottom in separated and assembled relation;

Figure 1:
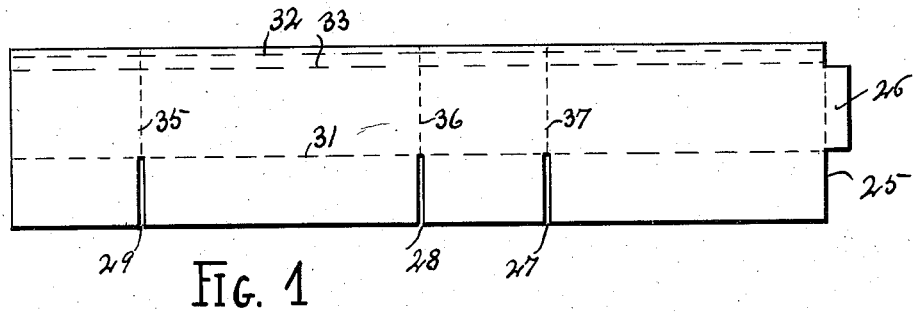
Fig. 1 is a plan view of a single sheet of metal from which one of my receptacles may be made.

Referring now to the drawings more in detail and particularly Figs. 1 to 7, thereof, reference character 25, Fig. 1, indicates a sheet or strip of sheet metal of suitable weight adapted for the production of a one-piece receptacle or box. The blank is rectangular in contour and is provided at one end with a projecting lip 26. Along one edge the blank is provided with cuts 27, 28 and 29 extending to the bending line 31 indicated in Fig. 1 in dotted lines. The dotted lines 32 and 33 indicate bending lines along which the upper edge of the blank is bent to form the strengthening bead or roll 34, best shown in Fig. 2. Reference characters 35, 36 and 37 indicate bending lines along which the metal is bent to form the corners of the receptacle.

Figure 2:
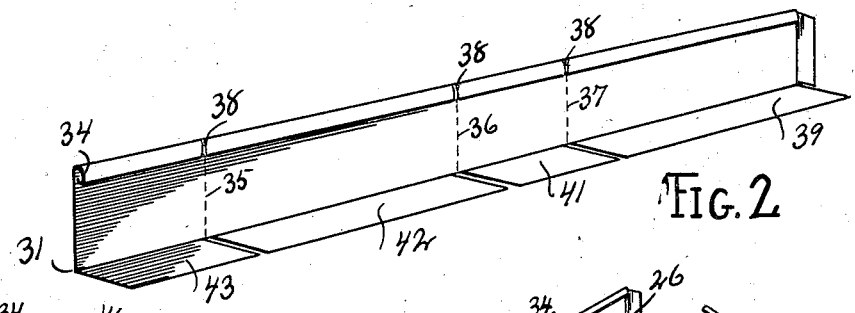
Fig. 2 is a perspective view of the same sheet showing the bead formed thereon and mitered and the bottom forming flanges turned at right angles to the side wall.
Figures 3, 4, 5:
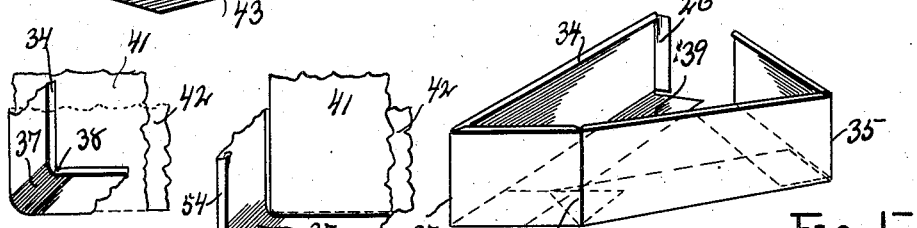
Fig. 3 is a fragmentary exterior view of one of the receptacle corners.
Fig. 4 is a similar view of the interior of one of the corners.
Fig. 5 is a perspective view showing the manner of assembly of the receptacle.
Figure 6:
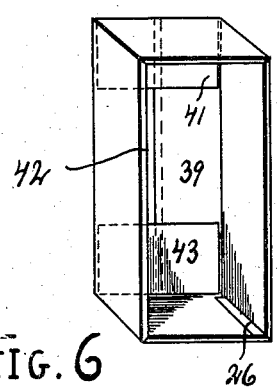
Fig. 6 is a top view of an assembled receptacle.
Figure 7:
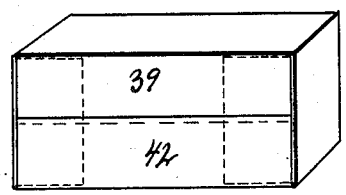
Fig. 7 is a bottom view thereof.
Figure 17:
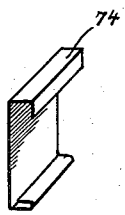
Fig. 17 is a fragmentary view showing the edges of such sheet bent to shape.

The blank after having been stamped or cut out in the form shown in Fig. 1 is run through a beading or a folding machine which forms the bead 34 shown in Fig. 2 or a strengthening rib of some other character, several forms of which are illustrated in succeeding figures and will be later described. It is then bent along line 31 into the form shown in Fig. 2 and at this stage or previously to the bending along line 31, the bead 34 is mitered as indicated by reference character 38. This mitering, which is at the upper end of each of the bending lines 35, 36 and 37, consists in simply flattening down the bead with a blunt or dull edged tool or suitable mechanism so that the blank will readily bend at this point.

The blank is then bent at right angles along lines 35, 36 and 37 so that the laterally extending flanges 39, 41, 42 and 43 are brought into overlapping relation to form the bottom of the receptacle as will be apparent from views 6 and 7. The overlapping bottom pieces are then preferably spot-welded together at a plurality of points to hold the structure in assembled relation and the projecting tongue 26 having been bent at right angles to the original plane of the blank is spot-welded to the inner face of the overlapping end wall of the receptacle as will be apparent from Figs. 5 and 6. The miters 38 formed in the bead 34 permit the bead to readily bend to form the corners of the receptacle and when bent the edges of the bead at the miters fit closely together as will be apparent from Figs. 3, 4 and 6, and the entire upper edge of the receptacle is strengthened and reinforced by the bead which extends entirely around said upper edge. The receptacle thus formed may be quickly and economically made with a minimum amount of labor and forms an integral one-piece receptacle possessing, by reason of the reinforcing bead at the top and the overlapping flanges at the bottom which are spot-welded together, great strength and rigidity.

Instead of the closed bead 34 previously described the top of the receptacle walls may be strengthened by a simple folded or rolled bead indicated by reference character 44 in Figs. 8 and 9 and instead of making the bottom integral with the side walls, each side wall may be provided at its lower edge with an inturned flange 45 adapted to support a structurally independent bottom 46 which may be spot-welded to the flanges 45 to form a strong, substantial construction.

Obviously other than the rectangular receptacles may be made in a similar manner and in Fig. 10 is illustrated a polygonal form which may be produced by the same method heretofore described. The side wall frame structure is indicated in this figure by reference character 47.

Instead of making all the side walls from a single blank they may be made of two blanks if preferred and in Fig. 11 such a construction in dis-assembled relation is disclosed. In this instance one blank 48 is beaded, mitered and bent to form a side and an end wall and another blank 49 is similarly formed to provide the complemental end and side walls, the two blanks being spot-welded together where the flanges 51 and 52 overlap the adjacent walls, and a separate bottom piece 53 may be employed which is preferably spot-welded to the bottom flanges of the side and end walls.

In Fig. 12 a blank is shown as bent in accordance with my method to provide both sides and an end wall of a receptacle, the free ends of the two side walls 54 and 55 being provided respectively with inwardly extending flanges 56 and 57 adapted to overlap and be spot-welded to a structurally independent end member 58.

In Fig. 13 I have illustrated a construction in which a single sheet of metal is bent to form the side walls 59 and 61, the end walls 62 and 63, the longitudinal partition wall 64, and transverse partition walls 65 and 66, thus dividing the receptacle into compartments. In this instance the bottom may be formed integrally with the side and end walls as previously described in connection with Figs. 1 to 7, or may be independent therefrom and spot-welded directly in accordance with the disclosure of Figs. 9 and 11.

In Fig. 14 a still further modification is shown in which the partition walls 67 are formed integrally with and bent upwardly from the bottom 68.

In Fig. 15 is shown another method of fastening the bottom in place. In this instance, the bottom flange of either the end or side walls is folded back upon itself to form a guideway indicated by reference character 69, and the corresponding edges of locking strips 71 are bent to provide a tongue 72 adapted to be slid longitudinally into said guideway as shown at the right in Fig. 15. The bottom 73 in this instance is disposed upon the top of the guideway and within the locking strip, and the whole construction may be rigidly secured together by pressure which flattens the guideway and the locking strip so that the bottom is firmly gripped between them.

Figure 16:
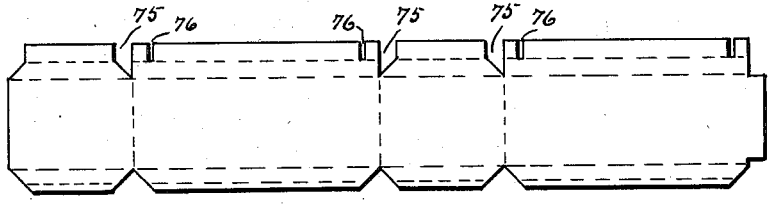
Fig. 16 is a plan view of a sheet of metal cut to form a modified form of receptacle.
Figure 18:
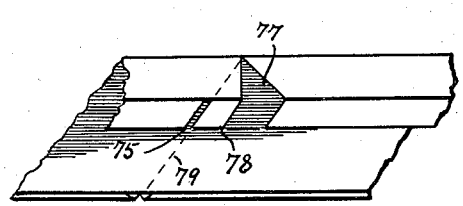
Fig. 18 is a perspective view showing the position of the cuts in the metal after the edges have been shaped.
Figure 19:
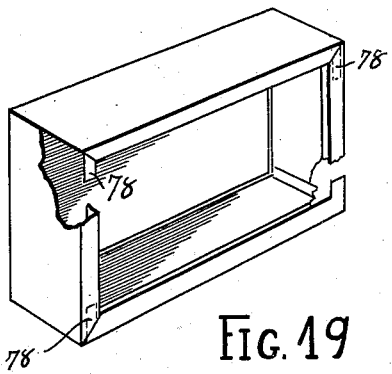
Fig. 19 illustrates a box formed from the blank shown in Fig. 16.
Figure 20:
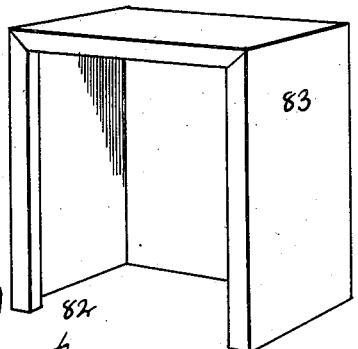
Fig. 20 illustrates a receptacle manufactured in accordance with my invention and comprising a removable bottom.

In Fig. 16 is disclosed a blank for forming a receptacle with a heavy reinforcing flange or bead at the top indicated in Figs. 17 to 21, inclusive, by reference character 74. In this instance the blank is notched before the bead is formed as indicated by reference character 75 and cuts 76 are made adjacent to the notches so that when the bead is folded or rolled over into the shape shown in Figs. 17 and 18 the notches form miters as indicated at 77, Fig. 18, leaving a tongue 78 between each cut 75 and its adjacent miter. When the blank is bent at right angles along line 79, the miters are closed, forming tight joints as shown in Figs. 19 and 20, and the tongues 78 are straightened out beneath the bead flanges as will be apparent from Fig. 19, thus locking the parts together and adding strength and rigidity to the structure. These tongues may also be spot-welded to the reinforcing bead if desired to increase the rigidity of the construction.

In Fig. 20 there is shown a construction employing the form of reinforcing bead shown in Figs. 16 to 19, inclusive, and in this structure the two side walls and top walls are integrally formed while the bottom 81 is made separate. This bottom is provided near each end with a channel shaped strip 82 spot-welded or riveted to the bottom and adapted to telescope within the side walls of the body structure 83. The outer flanges of these strips are spot-welded to the upright walls of the body and the inner flanges are adapted to form guides upon which a drawer may be slid into and out from the construction. This form of structure is particularly adapted for cabinet purposes.

Figure 21:
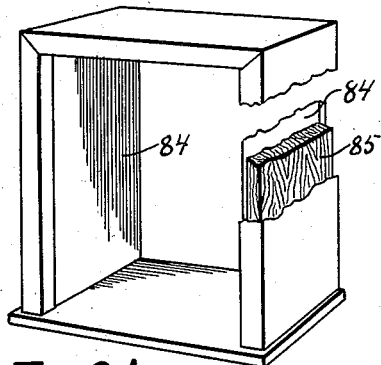
Fig. 21 illustrates a similar receptacle provided with a wooden interlining.

In Fig. 21 is shown a similar construction embodying, however, inner or lining walls 84 between which and the outer walls of the construction is disposed a lining 85 of wood composition or other suitable material.

Figure 22:
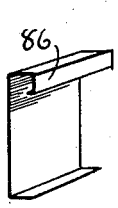
Figs. 22, 23 and 24 show modified forms of top and bottom flanges on the receptacle side walls.
Figure 23:
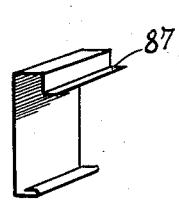
Figure 24:

In Fig. 22 is shown a modified form of top reinforcing bead indicated by reference character 86. In Fig. 23 is shown still a further modification in which the lower edge of the bead instead of being turned inwardly as shown in Fig. 22 is turned outwardly to form a supporting flange 87 to form a slide guideway. In Fig. 24 this guide slide is further modified by bending its edge downwardly and then inwardly to form the guide 88.

It is believed that my novel method, the preferred forms of construction resulting therefrom and many of the advantageous features thereof will be understood from the foregoing without further description, and obviously the structural details illustrated and described may be varied within wide limits without departing from the essence of the invention as defined in the following claims.

I claim:

1. A sheet metal receptacle including a plurality of side walls made from a single blank having one edge curled to constitute a reinforcing bead, said bead being flattened at a point where the blank is bent to form a corner of the receptacle.

2. A sheet metal receptacle made from a blank having one edge curled to constitute a reinforcing bead, said bead being flattened at points corresponding to the corners of the receptacle, the ends of the blank being rigidly connected together.

3. A receptacle having side walls formed from a single sheet of metal bent into polygonal form with the ends thereof secured together to provide a rigid structure, the upper edge of the sheet forming the side walls of the receptacle, being bent to provide an integral reinforcing bead extending around the upper edge of the receptacle and flattened at the corners of the receptacle.

4. A sheet metal receptacle formed from a single sheet of metal having one edge shaped to provide a reinforcing bead and provided at one end with a projecting tongue, said sheet being bent along a longitudinal line to provide bottom pieces and bent along transverse lines to dispose said bottom pieces in overlapping relation and form a polygonal receptacle, said tongue being rigidly connected with an overlapping side wall, and said bead being flattened at the corners of the receptacle.

5. The method of making a sheet metal receptacle which consists in bending one margin of a metal sheet inwardly to form a reinforcing bead, flattening said bead at spaced intervals toward the plane of the sheet, bending the sheet along lines intersecting said flattened portions, and fastening the overlapping ends of the sheet together to form the side walls of the structure.

6. The method of making a sheet metal receptacle which consists in bending a sheet of metal inwardly along one edge thereof to form a continuous reinforcing bead, slitting the opposite margin of the sheet at spaced intervals, flattening said bead toward the plane of said sheet on lines forming continuations of said slits, bending the sheet along said lines to form the side wall corners of the receptacle, bending the portions of the sheet between said slits inwardly to form the bottom of the receptacle and securing overlapping portions of the bent sheet together to provide a unitary rigid structure.

SOREN RINGER.